US005264263A

United States Patent [19]

Polat et al.

[11] Patent Number: 5,264,263

[45] Date of Patent: Nov. 23, 1993

[54] SHAPED GLAZING PROVIDED WITH A CURRENT NETWORK

[75] Inventors: Jacques Polat, Rothondes; Eric Szuwalski, Margny Les Compiegne, both of France

[73] Assignee: Saint-Gobain Vitrage International, Courbevoie, France

[21] Appl. No.: 12,983

[22] Filed: Feb. 3, 1993

Related U.S. Application Data

[63] Continuation of Ser. No. 724,778, Jul. 2, 1991, abandoned.

[30] Foreign Application Priority Data

Jul. 2, 1990 [FR] France ............................... 90 08314

[51] Int. Cl.[5] ............................................. B32B 3/00

[52] U.S. Cl. ..................................... 428/38; 428/192; 428/208; 428/426; 428/432; 428/433; 296/84.1

[58] Field of Search ................. 428/433, 38, 209, 256, 428/192, 426, 432; 296/84.1

[56] References Cited

U.S. PATENT DOCUMENTS 4,971,848 11/1990 Ruelle et al. .......................... 428/38

5,071,692 12/1991 Jourdaine ............................ 428/433

FOREIGN PATENT DOCUMENTS 0193464 9/1986 European Pat. Off. .

*Primary Examiner*—Patrick J. Ryan

*Assistant Examiner*—Abraham Bahta

*Attorney, Agent, or Firm*—Oblon, Spivak, McClelland, Maier & Neustadt

[57] ABSTRACT

A shaped heated glazing constituted by a cambered glass sheet is provided with a heating network. The light colored collecting strips are partly covered with a darker enamel coating having a greater heat absorption capacity so that, by modifying the pattern of said enamel coating, it is possible to modify the heating of the glass sheet during the heating preceding cambering, and consequently to better control the latter. The invention relates to car glazings of the rear window type.

6 Claims, 1 Drawing Sheet

SHAPED GLAZING PROVIDED WITH A CURRENT NETWORK

This application is a continuation of application Ser. No. 07/724,778, filed on Jul. 2, 1991, now abandoned.

BACKGROUND OF THE INVENTION

1. Field of the Invention

The present invention relates to a shaped glazing provided with a screen process printed current or electrical network for deicing and demisting. It relates in particular to a glazing of a car rear window type. More specifically, the invention relates to a glazing having a relatively pronounced curvature along its edges parallel to the collecting strips to which converge all the lines of the heating network and which are connected to current leads.

2. Description of the Background Art

Numerous cars are nowadays provided with a heated rear window. According to FR-B-1 464 586 such a glazing is obtained by depositing on the surface of a glass sheet a series of narrow resistance strips having an electrically conductive composition. These resistance strips are screen process printed flat on the glass sheet prior to its cambering, so that the baking of the electrically conductive composition takes place during the heating preceding the cambering and tempering of the glazing. The electrically conductive composition is formed by a pasty suspension in an organic binder of metallic silver and a frit, i.e., a low melting point glass. The resistance strips forming the network are relatively thin, so as not to interfere with the visibility through the glazing. They issue onto wider and therefore more conductive collective strips at positions close to the edges of the glazing. These collecting strips are formed from a composition identical to that of the resistance strips and are deposited in the same way and preferably at the same time as the latter. The current leads are then welded to these collecting strips.

With a view to the fitting to the vehicle by bonding or adhesion, which presupposes an opaque peripheral strip masking the adhesive from the outside and protecting it against solar radiation, or simply for aesthetic reasons, the glass sheet is usually provided with a black enamelled frame. The latter is obtained by screen process printing deposition of a paste relatively similar to a silver paste, but in which the silver is replaced by the appropriate dyes. Thus, prior to its cambering, the glazing undergoes at least two screen process printing operations, namely that corresponding to the deposition of the framing layer and, after drying, that corresponding to the heating network. To these may possibly be added a third screen printing step for locally increasing the layer thickness, e.g., in the areas where the leads are welded, and generally for adjusting the thickness of the network and consequently its conductivity.

The glazing can then be passed to the cambering-/tempering installation, where it is heated to the cambering temperature and is shaped in a cambering station. The manner of such shaping will not be described in detail, because numerous processes already exist and are well known. However, the shapes which are most difficult to obtain, at least when respecting the most severe optical quality standards, are those having surfaces with a very small radius of curvature with the fold lines located in the marginal areas of the glass sheet. However, it is precisely these shapes which are required in the case of car rear windows. Moreover, the need for an appropriate optical quality leads to a very marked preference for cambering processes in which the central area of the glazing, through which the driver sees, is not pressed between two cambering molds. Thus, in most cases, only the periphery of the glazing is strictly in accordance with a predefined template, and outside said periphery there remains a certain contour imprecision.

As a rule, these slight contour variations cause no problems. But they can still be prejudicial in the folded marginal zone constituting the engagement zone of the glazing on the vehicle body. Curvature defects can then lead to a certain sealing inefficiency, which produces a tendency to leak. In extreme cases, these defects may even make it impossible to fit the rear window in its frame. These cambering defects may also make it impossible to "slide" the glazing towards its final position (in case of glazings partly covering the body).

It is known that the contour of a glazing is very closely dependent on the temperature profile of the glass on leaving the furnace, the deformation speed of the glass increasing as the latter becomes hot. At the temperatures involved here, a difference of a few degrees is sufficient to produce cambering defects of several tenths of a millimeter, i.e., precisely those which are to be avoided here.

Different means have been proposed for controlling as accurately as possible the heating profile of a glass sheet in a heating furnace. However, these means, e.g., in which a burner accompanies the glass sheet in its advance in the furnace, make the installation more complicated, make numerous settings necessary and in any case the results obtained are not always completely satisfactory with respect to the reproducibility of the shapes obtained.

SUMMARY OF THE INVENTION

It is an object of the invention to provide a solution to this problem, based upon the recognition that the critical zone is also that where most of the collecting strips are concentrated. These collecting strips are white or whitish and consequently tend to reflect heat in a higher proportion that the transparent glass, and in an even higher proportion than the enamelled black strips which absorb more heat and are consequently heated to a greater extent.

Thus, in this critical zone there are both heat reflecting strips and heat absorbing strips. The invention provides very accurate control of the heating of the glass sheet in this critical zone by covering the reflecting strips, i.e., the white collecting strips, with a colored layer. The latter is preferably constituted by an enamelled coating deposited by a third or, if appropriate, fourth screen process printing operation.

The essential point with respect to this colored layer or coating is that it is colored differently from the collecting strip and consequently has a different heat reflection coefficient than the collecting strip. As a rule, said coating is black. The latter choice is virtually imposed, since the collecting strip is not placed directly on the glass, but instead on the enamelled black framing strip. The strips thus have coinciding shades.

The covering of the collecting strip is only partial and must at least leave free the welding zones for the leads. With the exception of this constraint, the covered areas must be distributed as a function of the temperature corresponding to the anticipated glazing shape. As a function of the particular case, it would thus be possible to form the colored coating layer as a screen formed of a series of varyingly wide, alternating black and white strips. The appropriate distribution for a given glazing shape is obtained by testing out different screens and by observing possible variations of the contours. Moreover, a given temperature profile can be produced by any one of a plurality of screens. A specific screen is selected as a function of the ease with which it can be deposited by screen process printing and on the basis of its aesthetic character.

It is finally pointed out that the choice of the screen configuration is not only dependent on the shape to be given to the glazing, but also its shade; a dark glass having a different heating behavior than a clear glass.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
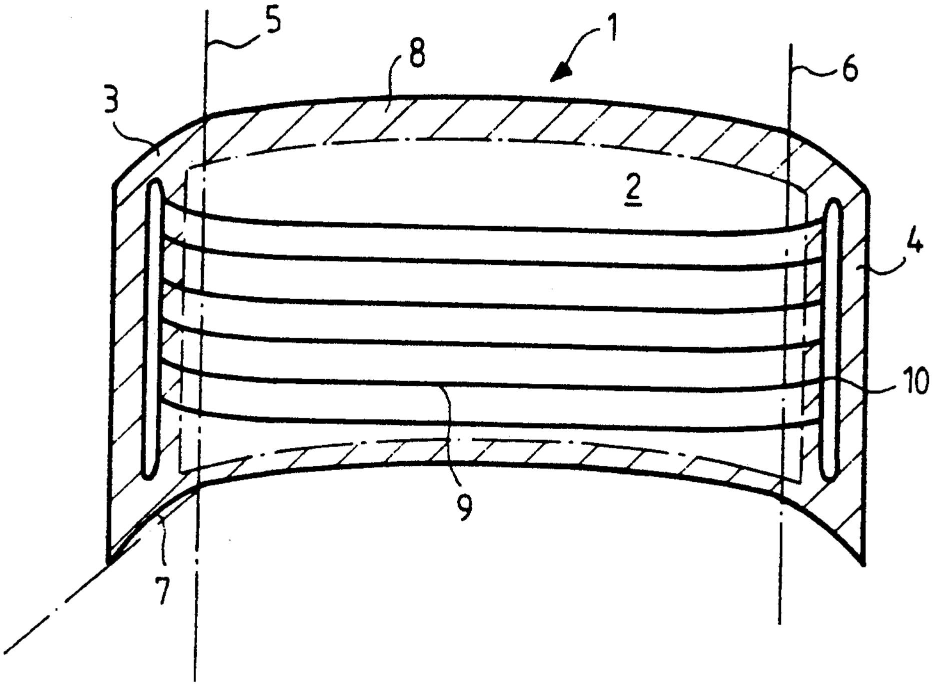
FIG. 1 is a schematic view of a car rear window, which is highly cambered in the area where the collecting strip is located.

FIG. 1 is a very schematic representation of a car rear window. The rear window 1 is constituted by a glass sheet (e.g., 3.2 mm thick) whose central portion 2 is slightly curved and whose lateral portions 3, 4 are highly folded about axes 5, 6. The lateral part has a certain curvature in the manner indicated at 7.

The entire periphery of the glazing is provided with a black enamel coating 8 forming a frame. It can be a continuous or non-continuous coating, e.g., formed from a succession of varyingly spaced points which become smaller and more widely spaced on approaching the central portion.

In order to demist and deice the central portion 2, a heating network is provided formed from thin conductive strips 9 made from a silvered frit and which all lead to wider collecting strips 10 arranged along two parallel edges. These silvered strips are white. The collecting strips receive the welded current leads.

The enamel coating 8 and strips 9, 10 of the heating network are all essentially formed from a suspension in a binder of a low melting point glass or frit. They are deposited by screen process printing and must then be baked. Baking takes place in the heating furnace for the glass sheets prior to cambering. In order to very accurately control the heating of the glass at the portions 3 and 4, with a view to obtaining a contour precisely in accordance with a given template, including at least a distance from the edges of the glazing, the collecting strips 10 are darkened, while preserving an adequate zone for carrying out the welding of the leads.

Figure 2:
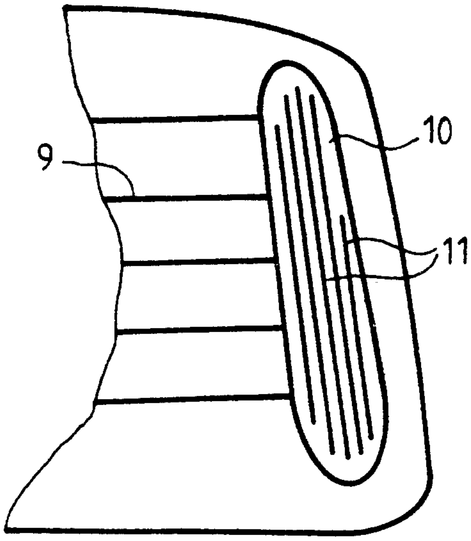
FIG. 2 is a larger scale view of a collecting strip partly covered by colored strips.

FIG. 2 illustrates a collecting strip covered with a screen formed of a series of black strips 11, which leads to the appearance of white lines therebetween.

This darkening is brought about by the deposition of a further black enamel coating, which masks the collecting strip. It is possible to use the same composition as for the coating 8 or any other, possibly less onerous, composition because the masking coating is not exposed to solar radiation (the heating network being on the inner face of the rear window, so that the masking overlayer is on the inside of the coating 8).

This overlayer is deposited so as to allow the appearance of part of the collecting strips, so as to constitute a screen formed as an alternation of dark and light areas, said areas being distributed so as to obtain the most appropriate heating for the shape of the glazing desired after cambering.

In the embodiment proposed in FIG. 2, the colored coating is arranged so as to form alternate black or white lines, which are of varying length as a function of their position on the glazing. It is obviously possible to envisage other patterns, e.g., in the form of checkering, dots, peas, split peas, etc., in accordance with a uniform or non-uniform distribution diagram, while taking account of the shaping of the glazing and ultimately the aesthetic appearance.

Therefore certain tests with respect to the patterns are required for each new glazing type, bearing in mind that a white area will be colder and will consequently lead to the formation of a relatively flatter area, whereas a black area will be hotter and will consequently lead to an area where deformation is accentuated. It should also be noted that the pattern preferably differs as a function of whether the glass sheet is or is not made from tinted glass. Once the pattern has been chosen, there is a perfectly repetitive cambering as a result of the very well controlled heating profile in an extremely localized manner, due to the accuracy of a deposit by screen process printing.

Obviously, numerous modifications and variations of the present invention are possible in light of the above teachings. It is therefore to be understood that within the scope of the appended claims, the invention may be practiced otherwise than as specifically described herein.

We claim:

1. Shaped heated glazing comprising:

a cambered glass sheet provided on one of its faces with resistance strips formed from an electrically conducting composition resulting from the baking of a suspension in an organic binder of metallic silver and a low melting point frit;

collecting strips formed from substantially the same electrically conducting composition as the resistance strips; and a colored coating at least partially covering the collecting strips, the colored coating having a color darker than that of the collecting strips heat reflection coefficient lower than a heat reflection coefficient of said collecting strips.

2. Heated glazing according to claim 1 wherein said colored coating is an enamel coating.

3. Heated glazing according to claim 2, wherein said enamel coating is black.

4. Heated glazing according to claim 1 wherein the glazing has an enamelled part and the collecting strips are deposited on the enamelled part of the glazing.

5. Heated glazing according to claim 1 wherein said colored coating forms a screen of strips in such a way that the glazing has a series of alternative black and white strips.

6. Heated glazing according to claim 5, wherein said colored coating forms a pattern taken from of one of the group consisting of checker, alternate line, dot, pea and split pea.

* * * * *